United States Patent [19]

Baasner et al.

[11] Patent Number: 4,826,634
[45] Date of Patent: May 2, 1989

[54] FLUORINATED ALKYLAMIDOSULPHONATES, THEIR PREPARATION, THEIR USE AS FLAME RETARDANTS, AND POLYCARBONATE MOULDING COMPOSITIONS CONTAINING THEM

[75] Inventors: Bernd Baasner, Leverkusen; Klaus D. Berg, Krefeld; Ulrich Grigo, Kempen, all of Fed. Rep. of Germany

[73] Assignee: Bayer Aktiengesellschaft, Leverkusen, Fed. Rep. of Germany

[21] Appl. No.: 159,145

[22] Filed: Feb. 23, 1988

[30] Foreign Application Priority Data

Mar. 14, 1987 [DE] Fed. Rep. of Germany ....... 3708316

[51] Int. Cl.⁴ .......................................... C07C 143/08
[52] U.S. Cl. ................................................. 260/513.6
[58] Field of Search ...................................... 260/513.6

[56] References Cited

U.S. PATENT DOCUMENTS 4,097,521  6/1978  Merkle et al. .................... 260/513.6

Primary Examiner—Nicky Chan
Attorney, Agent, or Firm—Sprung Horn Kramer & Woods

[57] ABSTRACT

Fluorinated alkylamidosulphonates of the formula

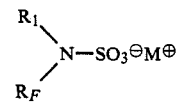

in which
$R^1$ represents hydrogen, alkyl or fluorinated alkyl,
$R_F$ represents fluorinated alkyl and
$M^\oplus$ represents an equivalent of a cation, a process for their preparation from the corresponding fluorinated alkylamidosulphonyl chlorides, their use as flame retardants for polycarbonate moulding compositions, and polycarbonate moulding compositions containing them.

5 Claims, No Drawings

FLUORINATED ALKYLAMIDOSULPHONATES, THEIR PREPARATION, THEIR USE AS FLAME RETARDANTS, AND POLYCARBONATE MOULDING COMPOSITIONS CONTAINING THEM

The present invention relates to new fluorinated alkylamidosulphonates, a process for their preparation from the corresponding, fluorinated alkylamidosulphonyl chlorides, their use as flame retardants, and polycarbonate moulding compositions containing them.

Alkylamidosulphonyl chlorides which are free of fluorine substituents in the alkyl radicals are known and can be obtained from amines through reaction with sulphuryl chloride (see Houben-Weyl, Methoden der Organischen Chemie [Methods of Organic Chemistry], Vol. XI/2, p. 693-695). If these are treated with a little alkali, the corresponding alkylamidosulphonic acids which are free of fluorine substituents in the alkyl radicals are obtained. Using larger amounts and/or more concentrated alkali, the corresponding alkylamidosulphonic acid salt which is free of fluorine substituents in the alkyl radicals is formed, at most in traces. Such conditions lead, very predominantly to exclusively, to breaking of the N—S bond, and thus to formation of alkylammonium sulphates and/or amines, hydrochloric acid, sulphuric acid and/or the salts of the lastmentioned acids (see Houben-Weyl, in loco citato, p. 682-684).

The behaviour of alkylamidosulphonic acids which contain no fluorine substituents in the alkyl radicals cannot be transferred to alkylamidosulphonyl chlorides having fluorine substituents in the alkyl radicals since such fluorine substituents reduce the basicity of the nitrogen atom and even easier breaking of the N—S bond by alkalis is to be expected. With respect to their action on the basicity of the nitrogen atom, fluorinated alkyl groups can be compared, if at all, with R—CO groups. If alkylamidosulphonyl chlorides having R—CO substituents on the nitrogen are treated with alkalis, complete decomposition of the molecule with cleavage of the N—S bond takes place (see Houben-Weyl, in loco citato, p. 683/684).

New fluorinated alkylamidosulphonates of the formula (I)

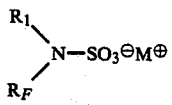
(I)

in which
- $R_1$ represents hydrogen, alkyl or fluorinated alkyl,
- $R_F$ represents fluorinated alkyl, and
- $M^\oplus$ represents an equivalent of a cation, have now been found.

If $R_1$ represents alkyl or fluorinated alkyl, alkyl radicals having 1 to 12 C atoms, for example, can be present which can optionally be substituted by 1 to 8 F atoms. Such alkyl and fluorinated alkyl radicals are preferably saturated, straight-chain or branched, and contain 1 to 6 C atoms and, if appropriate, 1 to 6 F atoms.

$R_F$ can be, for example, fluorinated alkyl radicals having 1 to 12 C atoms and 1 to 8 F atoms. Such fluorinated alkyl radicals are preferably straight-chain or branched and contain 1 to 6 C atoms and 1 to 6 F atoms.

$M^\oplus$ can be, for example, an equivalent of a metal cation, for example an equivalent of an alkali metal cation or alkaline-earth metal cation.

$R_1$ preferably denotes hydrogen or a saturated, straight-chain or branched alkyl radical which has 1 to 4 C atoms and which is free of fluorine atoms. $R_1$ particularly preferably denotes hydrogen, methyl, ethyl or propyl.

$R_F$ preferably denotes a saturated, straight-chain or branched, fluorinated alkyl radical having 1 to 4 C atoms and 1 to 4 F atoms. $R_F$ particularly preferably contains one terminal CF3 group and no further substituents on the alkyl chain, trifluoromethyl, trifluoroethyl, trifluoropropyl, trifluoroisopropyl and trifluorobutyl being very particularly preferred.

$M^\oplus$ preferably represents an equivalent of sodium ions, potassium ions or calcium ions Particularly preferred alkylamidosulphonates of the formula (I) are:

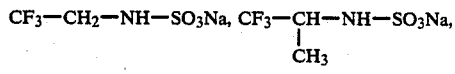

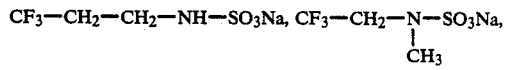

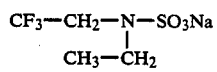

and the corresponding potassium salts.

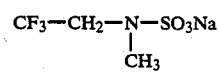

and the corresponding potassium salt is particularly preferred.

In addition, a process has been found for the preparation of fluorinated alkylamidosulphonates of the formula (I)

(I)

in which
- $R_1$ represents hydrogen, alkyl or fluorinated alkyl,
- $R_F$ represents fluorinated alkyl, and
- $M^\oplus$ represents an equivalent of a cation, which is characterized in that fluorinated alkylamidosulphonyl chlorides of the formula (II)

(II)

in which
$R_1$ and $R_F$ have the meanings given in the case of formula (I),
are hydrolysed by means of aqueous alkali.

Of the fluorinated alkylamidosulphonyl chlorides of the formula (II) to be employed in the process according to the invention, those can, for example, be preferably and particularly preferably used in which $R_1$ and $R_F$ have the meanings given above as illustrative, preferred and particularly preferred. Fluorinated alkylamidosulphonyl chlorides of the formula (II) can be obtained, for example, by the procedure described in DE-OS-(German Published Specification) No. 3,429,048.

Suitable temperatures for the hydrolysis according to the invention are, for example, those in the range from −20° to +100° C. Preferred temperatures are in the range −10° to +80° C., and particularly preferred temperatures are those in the range 0° to +50° C.

In principle, the process according to the invention can also be carried out at reduced or elevated pressure, but is usually carried out at atmospheric pressure.

The hydrolysis reaction according to the invention can be carried out using various amounts of alkali. Since 2 equivalents of alkali are stoichiometrically necessary for hydrolysis of one mole of fluorinated alkylamidosulphonyl chloride of the formula (II), at least 2 equivalents of alkali are preferably employed per mole of fluorinated alkylamidosulphonyl chloride of the formula (II). Larger excesses of alkali generally do no harm, but are expensive. 2 to 4 equivalents of alkali are therefore particularly preferably used per mole of fluorinated alkylamidosulphonyl chloride of the formula (II), and 2.05 to 3 are very particularly preferably used.

Suitable alkalis are, for example, the hydroxides of the alkali metals and alkaline-earth metals, in particular sodium hydroxide, potassium hydroxide and calcium hydroxide.

The hydrolysis reaction according to the invention is carried out in the presence of water. The amount of water can be varied within broad limits, for example in the range from 0.4 to 5 kg, relative to one mole of fluorinated alkylamidosulphonyl chloride of the formula (II) to be hydrolysed. In the simplest case, the alkali is employed in the form of an aqueous solution whose concentration is selected so that the desired amounts of alkali and water are present. In addition to water, inert organic solvents, for example alcohols, may also be present. However, these can lead to it being impossible to work in the homogeneous phase and/or to additional expense during work-up of the reaction mixture and disposal of the waste water from the reaction. It is therefore preferred that only low amounts of organic solvents are present, or none at all.

The reactants, in the simplest case aqueous alkali and the particular compound of the formula (II), can be mixed in any desired sequence. For example, a procedure can be followed in which the compound of the formula (II) is added dropwise to initially introduced aqueous alkali solution, the mixture is stirred, of appropriate, for 2 to 60 minutes at the reaction temperature after completion of the addition, and the product of the formula (I) is then isolated.

The mixture present after the reaction can be worked up in a simple fashion. For example, the aqueous crude solution can be concentrated until the product of the formula (I) precipitates and the chloride of the alkali metal employed, which is formed as a byproduct, is still in solution. After separation of the material thus precipitated, the product of the formula (I) is generally obtained in analytically pure form by washing with a little water and drying the product of the formula (I). Further fractions of the product of the formula (I) can be obtained from the mother liquor by further concentration and analogous work-up.

Fluorinated alkylamidosulphonates are generally prepared in yields of greater than 70%, frequently in yields of greater than 90%, using the process according to the invention, in particular when at least 2 product fractions are separated from the crude aqueous reaction solution by the measures described above. This is extremely surprising in view of the prior art outlined initially.

The new fluorinated alkylamidosulphonates of the formula (I) can be used, for example, as intermediates in the preparation of plant-protection agents, pharmaceuticals and dyestuffs. The present invention furthermore relates to the use of fluorinated alkylamidosulphonates of the formula (I)

in which $R_1$ represents hydrogen, alkyl or fluorinated alkyl,
$R_F$ represents fluorinated alkyl, and
$M^\oplus$ represents an equivalent of a cation, as flame retardants for polycarbanate moulding compositions.

For this use, preferred, particularly preferred and very particularly preferred compounds of the formula (I) are those which have been correspondingly characterized above in the description of the new fluorinated alkylamidosulphonates of the formula (I).

Polycarbonate moulding compositions according to the invention can contain fluorinated alkylamidosulphonates of the formula (I), for example in amounts from 0.05 to 1% by weight, preferably in amounts from 0.1 to 0.5% by weight, relative to the weight of the polycarbonate+flame retardants. In addition, polycarbonate moulding compositions according to the invention can contain conventional additives in conventional amounts, for example thermostabilizers, hydrolysis stabilizers and/or UV stabilizers, impact modifiers and/or mould-release agents.

Suitable polycarbonate components in the polycarbonate moulding compositions according to the invention are, for example, aromatic polycarbonates which are known per se, as obtainable, for example, through polycondensation of diphenols with phosgene or diesters of carbonic acid The diphenols can be unsubstituted dihydroxydiarylalkanes, but alternatively those whose aryl radicals are substituted, for example by $C_1$-$C_4$-alkyl groups, for example methyl groups, and/or by halogen atoms, for example chlorine atoms, in each case in the o- and/or m-position to the hydroxyl group.

The following diphenols are especially suitable: hydroquinone, resorcinol, 4,4'-dihydroxydiphenyl, bis-(hydroxy-phenyl)-alkanes, such as $C_1$- to $C_8$-alkylene- and $C_2$- to $C_8$-alkylidene-bisphenols, bis-(hydroxyphenyl)-cycloalkanes, such as $C_5$- to $C_{15}$-cycloalkylene- or $C_5$- to $C_{15}$-cycloalkylidenebisphenols, bis-(hydroxyphenyl) sulphides, bis-(hydroxy-phenyl) ethers, bis(hydroxy-phenyl) ketones, bis-(hydroxy-phenyl) sulphoxides or bis-(hydroxy-phenyl) sulphones. Furthermore, $\alpha,\alpha'$-bis-(hydroxy-phenyl)-diisopropylbenzene and the corresponding ring-alkylated and/or ring-halogenated compounds.

Preferred polycarbonates are those based on 2,2-bis-(4-hydroxy-phenyl)-propane (bisphenol A), 2,2-bis-(4-hydroxy-3,5-dichloro-phenyl)-propane (tetrachlorobisphenol A), 2,2-bis-(4-hydroxy-3,5-dibromo-phenyl)- propane (tetrabromobisphenol A), 2,2-bis-(4-hydroxy-3,5-dimethylphenyl)-propane (tetramethylbisphenol A), 1,1-bis-(4-hydroxy-phenyl)-cyclohexane (bisphenol Z) and those based on trinuclear bisphenols, such as α,α'-bis-(4-hydroxyphenyl)-p-diisopropylbenzene. Further suitable diphenols are described in U.S. Pat. Nos. 2,970,131, 2,991,273, 2,999,835, 2,999,846, 3,028,365, 3,062,791, 3,148,172, 3,271,367 and 3,275,601.

Branched polycarbonates are also suitable as the basis for polycarbonate moulding compositions according to the invention.

The polycarbonates can, for example, have weight average molecular weights $\overline{M}_w$ in the range 10,000 to 100,000 (determined by measuring the relative viscosity in methylene chloride at 25°). This weight average molecular weight is preferably in the range of 15,000 to 40,000. Suitable molecular weight regulators are, for example, monofunctional phenols, such as phenol, p-tert.-butylphenol and/or p-isooctylphenol.

Polycarbonate moulding compositions according to the invention can be produced, for example, by compounding polycarbonate with 0.05 to 1% by weight of fluorinated alkylamidosulphonates of the formula (I) and, if appropriate, further additives in an extruder at 250° to 300° C.

The polycarbonate moulding compositions according to the invention are distinguished by the fact that the combustion test in accordance with Underwriters' Laboratories Inc., Bulletin 94, gives a classification in the class VO (for details, see Examples 11 and 12).

The following examples illustrate the present invention without representing and limitation.

EXAMPLES

Examples 1 to 10

The products prepared in accordance with Examples 1 to 10 are identified by elemental analysis and by their IR and mass spectra. The latter were recorded using the FAB technique (fast atomic bombardement).

Example 1

35.8 g (0.2 mol) of 2,2,2-trifluoromethylamidosulphonyl chloride in 350 ml of water were added dropwise over the course of 15 minutes to 20 g of sodium hydroxide at room temperature while cooling with water. The solution was subsequently stirred for a further 15 minutes at 40° C. and concentrated in a water-pump vacuum to a fifth of the original volume. The deposited precipitate was filtered off under suction, washed with a little water and dried. 30.4 g (75.6% of theory) of sodium N-(2,2,2-trifluoroethyl)-amidosulphanate were obtained in the form of colourless crystals of melting point above 250° C.

A further 6.1 g (15.1% of theory) of sodium N-(2,2,2-trifluoroethyl)-amidosulphonate were obtained by further concentration and filtration under suction of the filtrate, which was combined with the washing phase, and by washing with water and drying the solid.

The total yield was thus 36.5 g (90.7% of theory).

Example 2

A procedure as in Example 1 was followed, but the appropriate amount of 2,2,2-trifluoro-1-methyl-ethylamidosulphonate was employed. The total yield of sodium N-(2,2,2-trifluoro-1-methyl-ethyl)-amidosulphonate of melting point above 250° C. was 80 2% of theory.

Example 3

A procedure as in Example 1 was followed, but the appropriate amount of 3,3,3-trifluoropropyl-amidosulphonyl chloride was employed and sodium N-(3,3,3-trifluoropropyl)-amidosulphonate of melting point above 250° C. was obtained in a total yield of 93.6% of theory.

Example 4

A procedure as in Example 1 was followed, but the appropriate amount of 2,2,2-trifluoroethyl-N-methylamidosulphonate was employed and sodium N-(2,2,2-trifluoroethyl)-N-methyl-amidosulphonate of melting point above 250° C. was obtained in a total yield of 97.8% of theory.

Example 5

A procedure as in Example 1 was followed, but the appropriate amount of 2,2,2-trifluoroethyl-N-ethyl-amidosulphonyl chloride was employed and sodium N-(2,2,2-trifluoroethyl)-N-ethyl-amidosulphonate of melting point above 250° C. was obtained in a total yield of 78.1% of theory.

Examples 6 to 10

In each case, a procedure as in Examples 1 to 5 was followed, but 27.5 g of potassium hydroxide were in each case employed in place of 20 g of sodium hydroxide. The following were obtained:

Example 6

Potassium N-(2,2,2-trifluoroethyl)-amidosulphonate of melting point 245° C. (decomposition) in a total yield of 96.8% of theory.

Example 7

Potassium N-(2,2,2-trifluoro-1-methyl-ethyl)amidosulphonate of melting point above 250° C. in a total yield of 78.4% of theory.

Example 8

Potassium N-(3,3,3-trifluoropropyl)-amidosulphonate of melting point above 250° C. in a total yield of 96.3% of theory.

Example 9

Potassium N-(2,2,2-trifluoroethyl)-N-methyl-amidosulphonate of melting point above 250° C. in a total yield of 89.1% of theory.

Example 10

Potassium N-(2,2,2-trifluoroethyl)-N-ethyl-amidosulphonate of melting point above 250° C. in a total yield of 84.8% of theory.

Examples 11 and 12

Combustion tests

In accordance with the UL 94 test (Underwriters' Laboratories, Inc., Bulletin 94), polycarbonate samples were moulded into rods measuring 127×12.7×3.2 mm. The rods were mounted vertically so that the underside of the samples was 305 mm above a strip of bandage material. Each sample rod was ignited individually by means of two ignition operations lasting 10 seconds following one another, and the combustion properties were observed after each ignition operation and the sample was accordingly evaluated. A Bunsen burner having a 10 mm blue flame of natural gas with a heat capacity of $3.73 \times 10^4$ kJ/m$^3$ was used for igniting the sample.

For classification in the UL 94 VO class, it is necessary that none of the samples burns for longer than 10 seconds after each application of the test flame, a total flaming time of more than 50 seconds for the two applications of flame to each set of samples does not occur, none of the samples burn completely up to the holding clamp fixed to the upper end of the samples, none of the samples ignite the bandage material by burning drops or particles, and the samples do not glow for longer than 30 seconds after removal of the test flame.

Other UL 94 classifications designate samples which are less flame resistant and are self-extinguishing (UL 94 V1) and release flaming drops or particles (UL 94 V2).

Example 11

9,000 g of bisphenol A homopolycarbonate of relative viscosity 1.29, measured in methylene chloride at 25° C., were extruded at 300° C. through an extruder to form a strand and subsequently granulated. Test specimens measuring $127 \times 12.7 \times 3.2$ mm (in accordance with the UL 94 test) were moulded from the granules on an injection-moulding machine at 280° C., and the UL 94 test described above was carried out on these specimens. This gave the classification UL 94 V2 (3.2 mm)

Example 12

40 g of

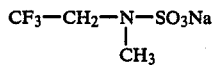

(0.4% by weight) were added to 8,960 g of the bisphenol A homopolycarbonate described in Example 11. The mixture was extruded at 300° C. through an extruder to form a strand and subsequently granulated. Test specimens measuring $127 \times 12.7 \times 3.2$ mm (in accordance with the UL 94 test) were moulded from the granules on an injection-moulding machine at 280° C., and the UL 94 test was carried out on these specimens. This gave the classification UL 94 VO (3.2 mm).

What is claimed is:

1. Fluorinated alkylamidosulphonate of the formula (I)

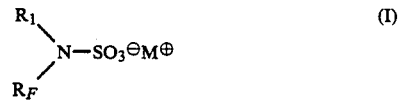

in which
$R_1$ represents hydrogen, alkyl or fluorinated alkyl,
$R_F$ represents fluorinated alkyl, and
$M^\oplus$ represents an equivalant of a cation.

2. Fluorinated alkylamidosulphonate according to claim 1, in which $R_1$ represents in unsubstituted alkyl radical having 1 to 12 C atoms and $R_F$ represents a fluorinated alkyl radical having 1 to 12 C atoms and 1 to 8 F atoms.

3. Fluorinated alkylamidosulfonate according to claim 1, in which $R_1$ represents an alkyl radical substituted by 1 to 8 F atoms and $R_F$ represents a fluorinated alkyl radical having 1 to 12 C atoms and 1 to 8 F atoms.

4. Fluorinated alkylamidosulphonate according to claim 1, in which represents an equivalent of an alkali metal cation or an alkaline-earth metal cation.

5. Fluorinated alkylamidosulphonate selected from the group consisting of

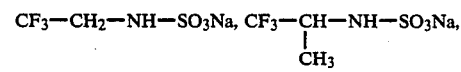
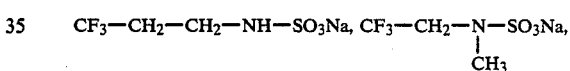
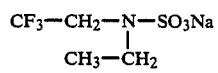

and the corresponding potassium salt.

* * * * *

UNITED STATES PATENT AND TRADEMARK OFFICE
CERTIFICATE OF CORRECTION

PATENT NO. : 4,826,634

DATED : May 2, 1989

INVENTOR(S) : Baasner et al

It is certified that error appears in the above-identified patent and that said Letters Patent is hereby corrected as shown below:

Col. 8, line 26    After "which" add --a--

Signed and Sealed this

Fifth Day of June, 1990

Attest:

HARRY F. MANBECK, JR.

*Attesting Officer*    *Commissioner of Patents and Trademarks*